United States Patent
Wurman

Patent Number: 5,434,570
Date of Patent: Jul. 18, 1995

[54] WIDE-ANGLE MULTIPLE-DOPPLER RADAR NETWORK

[76] Inventor: Joshua M. A. R. Wurman, 2224 13th St., Boulder, Colo. 80302

[21] Appl. No.: 159,393

[22] Filed: Nov. 30, 1993

[51] Int. Cl.⁶ .............................................. G01S 13/48
[52] U.S. Cl. ........................................ 342/26; 342/104
[58] Field of Search ......................... 342/26, 104, 460

[56] References Cited

U.S. PATENT DOCUMENTS

| | | | |
|---|---|---|---|
| 4,219,887 | 8/1980 | MacCready, Jr. | 342/26 X |
| 4,994,809 | 2/1991 | Yung et al. | |
| 5,136,296 | 8/1992 | Roettger et al. | 342/26 |
| 5,175,551 | 12/1992 | Rubin | 342/26 |
| 5,235,341 | 8/1993 | Effland et al. | 342/460 |

OTHER PUBLICATIONS

"Bistatic Radars", Michael R. B. Dunsmore, *Alta Frequenza* vol. LVIII, No. 2, Mar. Apr. 1989.
"Synchronization Aspects for Bistatic Radars", Bovey and Horne, Plessy Research, Roke Manor UK.
"Principles of Independent Receivers for use with Co–operative Radar Transmitters", J. G. Schoenenberger and J. R. Forrest, *The Radio and Electronic Engineer* vol. 52, No. 2, Feb. 1982.
Article entitled "Measuring Winds With Pulsed C–Band Radar" in *NASA Technical Briefs*, Oct. 1989, p. 28, by C. Lennon et al.

*Primary Examiner*—Mark Hellner
*Attorney, Agent, or Firm*—Homer L. Knearl; Hancock & Knearl

[57] ABSTRACT

The sky is scanned with transmitted radar pulse beam of electromagnetic radiation from a high gain antenna with a narrow viewing angle, and by monitoring the echoes with a low gain receiving antenna that has a wide, or moderate, viewing angle of the sky. The source of echo signals along the direction of the radar puls beam path are defined by synchronizing the sampling of the echo signal at the receiving station with the transmission of radar pulses at the transmitting station. The receiving station defines the location of an echo signal source by knowing the locations of the transmitting and receiving antennas, the pointing angle of the transmitted beam and the relative time between transmission of the radar pulse and receipt of each echo signal sample of along the transmitted beam path. The relative time can be defined by synchronizing the sampling of the echo signal with each transmitted pulse.

12 Claims, 9 Drawing Sheets

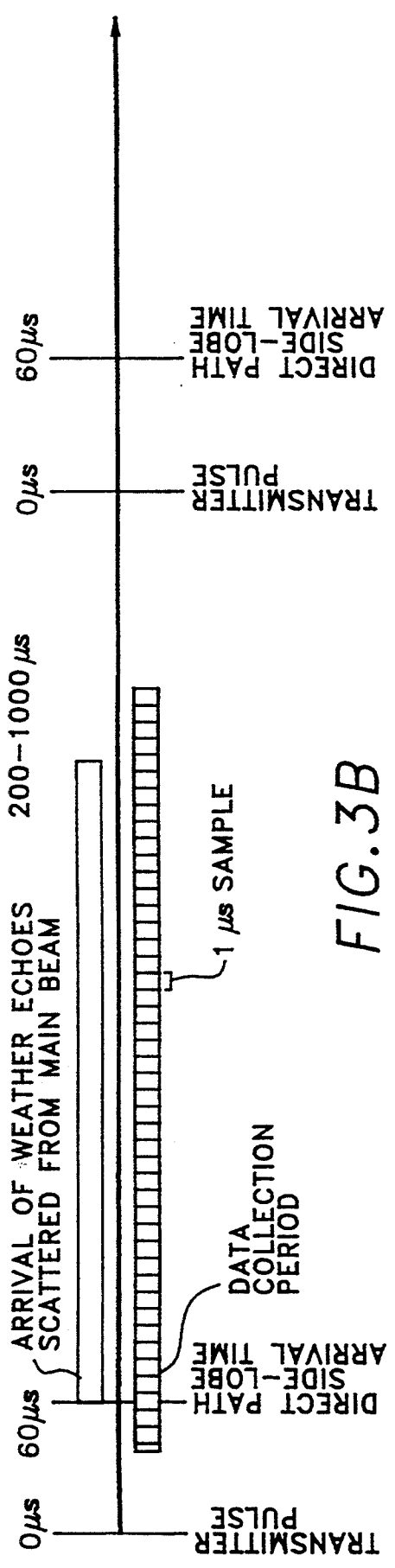
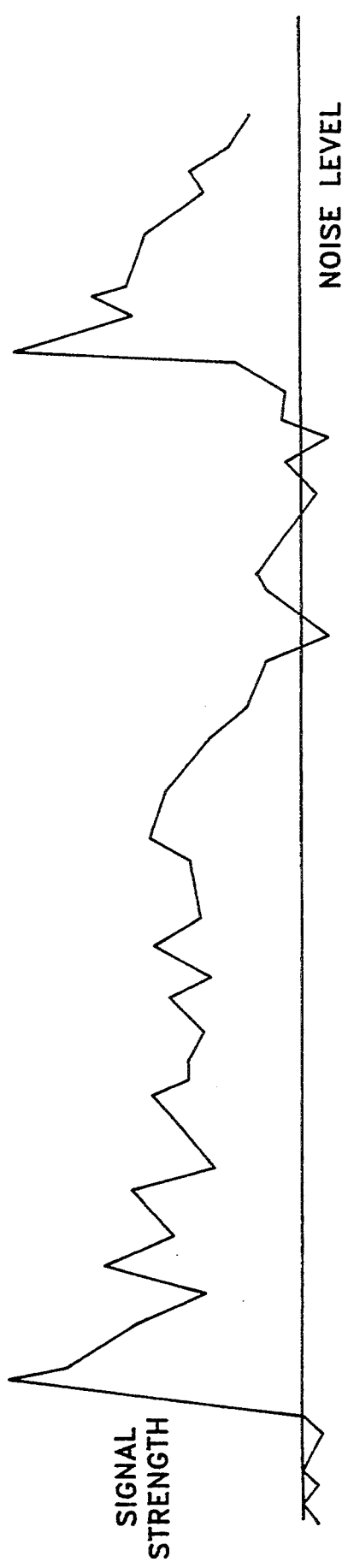
FIG.3B
FIG.3A

WIDE-ANGLE MULTIPLE-DOPPLER RADAR NETWORK

CROSS REFERENCE TO RELATED APPLICATIONS

Copending, concurrently filed U.S. patent application Ser. No. 08/169,561, entitled "Bistatic Multiple-Doppler Radar Network," relates to additional embodiments of the present invention and is incorporated herein by reference.

BACKGROUND OF THE INVENTION

1. Field of the Invention

This invention is directed to a method and apparatus for detecting the location, velocity, size and type of particles in a weather system. More particularly, the invention relates to detecting particles in a weather system with a wide-angle multiple-Doppler radar network using a single transmitting antenna and at least one passive receiving antenna with a wide angle view.

2. Description of Prior Art

A conventional Doppler radar station is a monostatic station meaning the transmitting antenna is also the receiving antenna. Such a station may focus a beam of transmitted electromagnetic radiation on water particles in a cloud, and from the Doppler shift in echoes from the particles determine the component of velocity of the particles in the direction of the beam. In effect, the single radar station can detect the velocity of particles, and thus the wind, along a radial line from the radar station.

Bistatic and polystatic radar networks have been used in the past to detect the velocity of aircraft, missiles, etc. In a bistatic radar system, the transmitting and receiving antennas are separated. In a polystatic radar system, there are multiple receiving antennas for each transmitting antenna. The receiving antennas are focussed as a group as a narrow beam antenna monitoring the object illuminated by the transmitting beam. Exemplary of a polystatic radar system is the system taught in U.S. Pat. No. 4,994,809, entitled "Polystatic Correlating Radar." This radar system has no particular utility as a weather radar system.

The concept of using a multi-static radar system to detect wind velocity is briefly discussed in an article entitled "Measuring Winds With Pulsed C-Band Radar" in *NASA Technical Briefs*, October 1989. The article proposes to use multiple receiving stations; i.e., a polystatic system to get velocity vectors in multiple directions so as to determine the actual velocity of particles and, thus, the wind. This system uses a narrow beam receiving station. Accordingly, the receiving station would detect wind velocity at one point in the sky; i.e., the intersection of the transmitted beam and the focussed beam of the receiving station. To obtain any useful data, the receiving antenna would have to scan some length of the transmitted beam, the transmitted beam would have to be indexed and the receiving beam would have to again scan the transmitted beam. The problem with such a system is that obtaining wind velocity for more than one point in the sky requires either hundreds of antennas focussed on different parts of the transmitted beam or some system for rapid-coordinated scanning by multiple antennas. This would be an extremely expensive system if it could even operate quickly enough to obtain useful data for different portions of the sky.

SUMMARY OF THE INVENTION

It is an object of this invention to provide a low-cost, bistatic or polystatic radar network for collecting wind velocity data over many points in the sky.

In accordance with this invention, the above object is accomplished by scanning the sky with transmitted radar pulse beam of electromagnetic radiation from a high gain antenna with a narrow viewing angle, and by monitoring the echoes with a low gain receiving antenna that has a wide, or moderate, viewing angle of the sky. The source of echo signals along the direction of the radar pulse beam path are defined by synchronizing the sampling of the echo signal at the receiving station with the transmission of radar pulses at the transmitting station. The receiving station defines the location of an echo signal source by knowing the locations of the transmitting and receiving antennas, the pointing angle of the transmitted beam and the relative time between transmission of the radar pulse and receipt of each echo signal sample along the transmitted beam path. The relative time can be defined by synchronizing the sampling of the echo signal with each transmitted pulse.

To detect the velocity of particles from the echo signal, the echo signal samples are analyzed for Doppler shift. To perform the Doppler shift analysis, the frequency of the RF (Radio Frequency) signals at transmitter and receiver are synchronized for frequency coherence. In other words, the RF signal frequencies, though not in phase, are set to be at substantially the same frequency.

The frequency coherence synchronization of the RF signals at the transmitting and receiving stations and the time synchronization of echo signal sampling with transmitted pulses may be accomplished in a number of ways. First, the receiving antenna can monitor side-lobe radiation from the transmitting station to pick up the transmitted pulse and its carrier frequency. Second, the transmitting station could have a second antenna to beam a synchronization signal to the receiving station at a different frequency than the transmitted radar pulse carrier frequency. This synchronization signal is a copy of the radar pulse, but the copy pulse has a carrier frequency sufficiently different from the radar carrier frequency so as to not produce conflicting echo signals. Third, radiation from a third party source, such as television stations, navigation stations or navigation satellites, could be used to synchronize the transmitting and receiving radar stations. Such third party stations regularly transmit constant frequency signals and timed pulses. The frequency signals and the timed pulses are used to slave both transmitting and receiving radar stations, or to slave one of the radar stations to the other radar station.

The pointing angle of the transmitting antenna may be passed to the receiving station over a telephone link, a Radio Frequency (RF) link or any other manner of communication. If real time information is not required and the weather data is simply collected, the pointing angle may be recorded for each pointing angle scan interval and combined with the echo information for subsequent analysis.

If more Doppler velocity data is desired to improve the accuracy of the measured velocity, a polystatic arrangement with multiple receiving stations may be used. Each receiving station would use a wide or moderate viewing angle antenna, and would synchronize sampling of the echo signal to the transmitted pulse. A wide viewing angle antenna can be implemented with multiple narrow viewing angle antennas monitoring separate sectors of the sky.

The great advantage of the invention is that a complete sky scan can be obtained using inexpensive wide viewing angle antennas at the receiving stations. Other objects, advantages and features of the invention will be understood by those of ordinary skill in the art after referring to the complete written description of the preferred embodiments in conjunction with the following drawings.

BRIEF DESCRIPTION OF THE DRAWINGS

FIG. 3A is an example of an echo signal from obliquely scattered radiation as received at a remote receiving antenna.

FIG. 3B is on the same time scale with FIG. 3A and illustrates the relative timing of the transmitted radar pulse, the data collection period at the receiving antenna and the time sampling intervals for echo signal sampling.

DESCRIPTION OF THE PREFERRED EMBODIMENTS

Figure 1A:
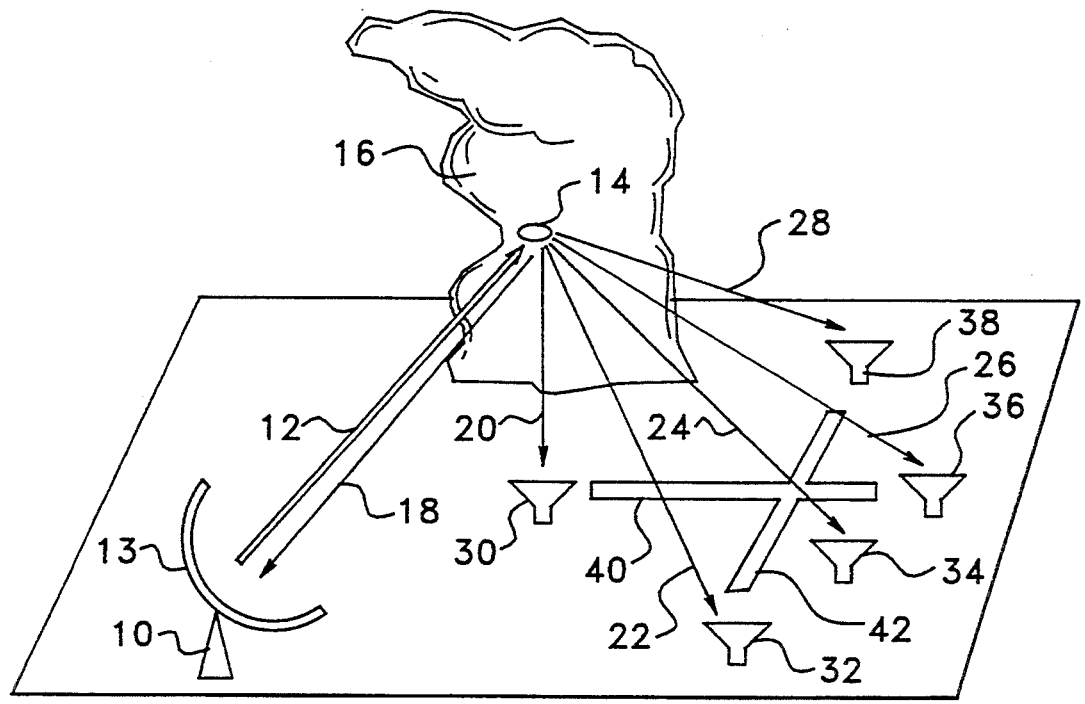
FIG. 1A shows the geographical layout of a bistatic multiple-Doppler radar network in accordance with the invention.

FIG. 1 illustrates an exemplary deployment of antennas at an airport in accordance with the Doppler radar system of the invention. The transmitting station 10 is a conventual Doppler weather radar station that sends out a pulsed beam 12. The pulses are bursts of gigahertz electromagnetic radiation having a duration of one microsecond. The frequency of radiation could be any frequency in a range from radio frequencies (megahertz) to ultra-violet light depending on the type of radiation source used. Likewise, the pulse duration could vary from tens of a microseconds to a nanosecond.

Beam 12 is focused by dish antenna 13 into a tight, or narrow, beam 1 to 10 square degrees in cross-section. Beam 12 illuminates a cluster 14 of water particles in a portion of thunderstorm cloud 16. Echoes from the water particles return to the transmitting station 12 and a plurality of receiving stations with wide viewing angle antennas. Echo 18 represents the back scattered reflected radiation detected by the transmitting station 12. Echoes 20, 22, 24, 26 and 28 are obliquely scattered radiation from the particle cluster 12 to low-gain, wide-angle antennas 30, 32, 34, 36 and 38, respectively. The low gain antennas are deployed near airport runways 40 and 42 where the invention may be advantageously used to detect winds, such as microbursts that might threaten aircraft. Of course, the invention might be employed anywhere one desires to use Doppler radar to monitor the movement of particles and detect wind velocity and direction from the movement.

The invention uses low-gain antennas at the receiving stations so that each receiving antenna has a wide-angle view of the sky. The term wide-angle or wide-viewing angle as used herein refers to both wide and moderate viewing angle antennas which typically have a viewing angle of 10,000 square degrees to 50 square degrees.

Figure 1B:
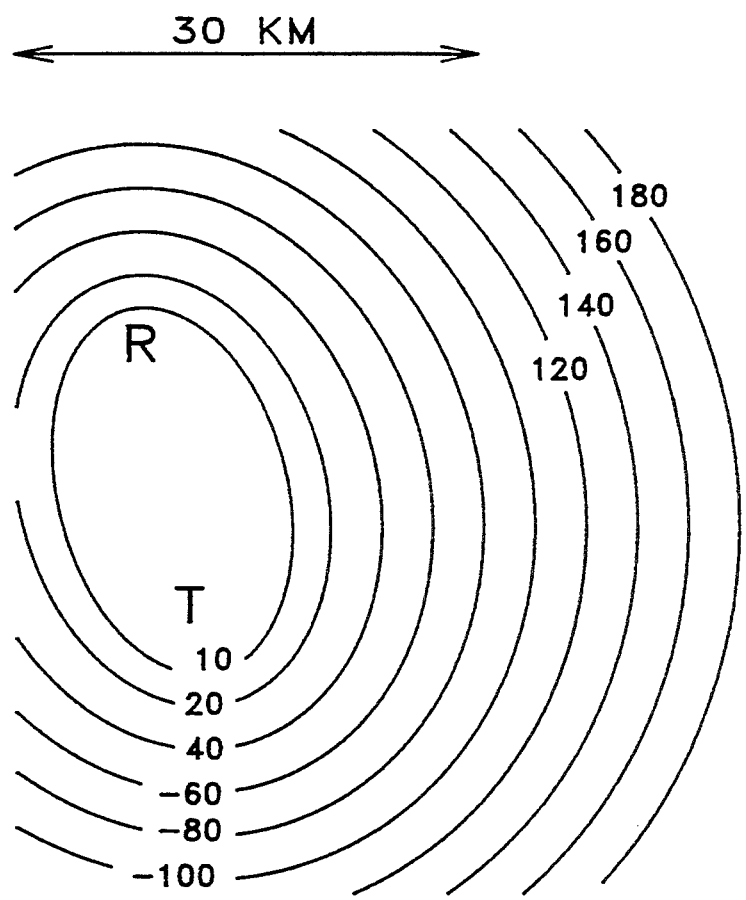
FIGURE 1B shows the delay time in microseconds between detection at a bistatic receiver (R) of direct radiation from transmitter (T) and receipt of obliquely scattered radiation.
Figure 1C:
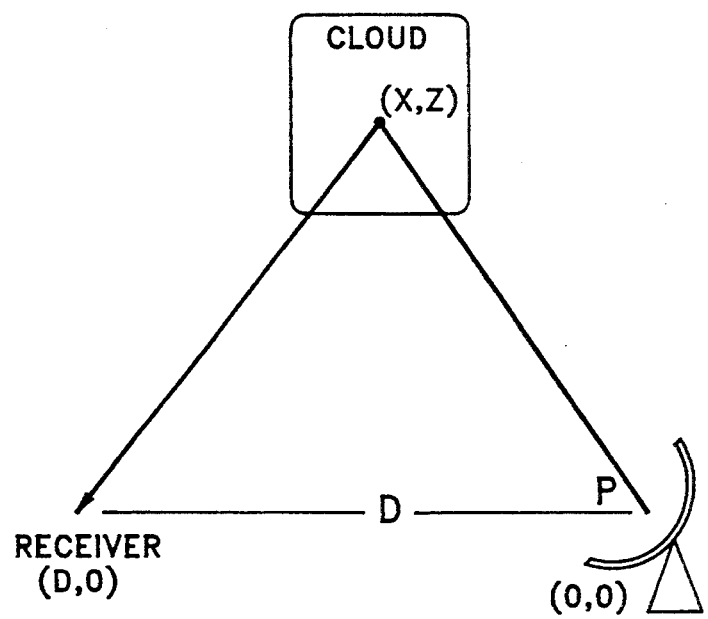
FIG. 1C is a schematic vertical plane two-dimensional illustration of bistatic ranging coordinates.

In a bistatic system, the location of scatterers in Cartesian space can be calculated from the pointing angle of the transmitting antenna and the time between transmission from the active radar and detection at the passive site. Surfaces of constant delay time form ellipsoids with foci at the two radar sites, as illustrated in FIG. 1B. The location of a scattering particle, or volume, relative to the transmitter, is specified by:

$$x = \frac{(ct)^2 - D^2}{2(ct - D\cos(p))} \sin(a)\cos(e)$$

$$y = \frac{(ct)^2 - D^2}{2(ct - D\cos(p))} \cos(a)\cos(e)$$

$$z = \frac{(ct)^2 - D^2}{2(ct - D\cos(p))} \sin(e)$$

where p is the angle enclosed by the transmitter-particle and transmitter-receiver vectors, D is the distance between the transmitter and the receiver, and a and e are the azimuth and elevation angles relative to the transmitting radar. This formulation is illustrated schematically in FIG. 1C for the two-dimensional case (y=0). In this simplified case, the angle p is equal to the elevation angle of the transmitter.

The mean Doppler shift of radiation scattered in the direction of a bistatic receiver is a function of the transmitter-scatterer-receiver geometry, as well as the scatterer's velocities. Various techniques for determining Cartesian (u, v, w) wind fields from radial are known. The reflectivity-weighted particle velocity can be retrieved at any point by solving the system of equations:

$VR_i = u \sin(a_i) \cos(e_i) + v \cos(a_i) \cos(e_i) + W_p \sin(e_i) = u \sin(a_i) \cos$ for $i = 1, n$;
where $VR_i$ are the radial velocities measured by the n radars, $a_i$ and $e_i$ are the azimuth and elevation angles, of the n radars, and u, v, wp are the Cartesian components of the particle velocity field. In dual-obtained Doppler analyses, the vertical air-parcel velocity $w_a$ is through the integration of mass continuity. If measurements are available from more than three radars (or more than two, in the case of dual-Dopper analyses where mass continuity is used), and a reflectivity-terminal velocity relationship is assumed, the system of equations is overdetermined and can be solved by minimizing error.

The above equation can be modified to apply to a Doppler network consisting of one transmitting radar and one or more passive bistatic receiving sites as follows:

$$\begin{bmatrix} \frac{\sin(a_1)\cos(e_1) + \sin(a_i)\cos(e_i)}{2} & \frac{\cos(e_1)\cos(a_1) + \cos(e_i)\cos(a_i)}{2} & \frac{\sin(e_1) + \sin(e_i)}{2} \\ \frac{\sin(a_2)\cos(e_2) + \sin(a_i)\cos(e_i)}{2} & \frac{\cos(e_2)\cos(a_2) + \cos(e_i)\cos(a_i)}{2} & \frac{\sin(e_2) + \sin(e_i)}{2} \\ \cdot & \cdot & \cdot \\ \cdot & \cdot & \cdot \\ \cdot & \cdot & \cdot \\ \sin(a_i)\cos(e_i) & \cos(e_i)\cos(a_i) & \sin(e_i) \end{bmatrix} \begin{bmatrix} U \\ V \\ \cdot \\ \cdot \\ \cdot \\ W_p \end{bmatrix} = \begin{bmatrix} VR_1 \\ VR_2 \\ \cdot \\ \cdot \\ \cdot \\ VR_i \end{bmatrix}$$

where $VR_i$ are the particle velocities perpendicular to the ellipsoidal constant phase surfaces calculated from the Doppler-shifted radiation at the n bistatic sites, $a_i$ and $e_i$ are the azimuth and elevational angles of the illuminated volume relative to the n passive receiving sites. $VR_t$ is the radial velocity calculated at the transmitting radar, and $a_t$ and $e_t$ are the pointing angles of the transmitting antenna. The above equation for a three-receiver network can be solved for (u, v, $w_p$) as follows:

$$\frac{1}{\delta} \begin{bmatrix} \alpha_1 & \beta_1 & \gamma_1 \\ \alpha_2 & \beta_2 & \gamma_2 \\ \alpha_i & \beta_i & \gamma_i \end{bmatrix} \begin{bmatrix} VR_1 \\ VR_2 \\ VR_i \end{bmatrix} = \begin{bmatrix} U \\ V \\ W_p \end{bmatrix}$$

$\alpha_1 = 2[\cos(e_2)\cos(a_2)\sin(e_i) - \cos(e_i)\cos(a_1)\sin(e_2)]$
$\alpha_2 = 2[\sin(a_1)\cos(e_1)\sin(e_2) - \sin(a_2)\cos(e_2)\cos(e_i)]$
$\alpha_i = 2\{\cos(e_2)\cos(e_1)[\sin(a_2)\cos(a_1) - \sin(a_1)\cos(a_2)]\}$
$\beta_1 = 2[\cos(e_1)\cos(a_1)\sin(e_1) - \cos(e_1)\cos(a_1)\sin(e_i)]$
$\beta_2 = 2[\sin(a_1)\cos(e_1)\sin(e_i) - \sin(a_i)\cos(e_i)\sin(e_1)]$
$\beta_i = -2\{\cos(e_1)\cos(e_i)[\sin(a_1)\cos(a_i) - \sin(a_i)\cos(a_1)]\}$ $\gamma_1 = \cos(e_1)\cos(a_1)[\sin(e_2) + \sin(e_1)] - \cos(e_2)\cos(a_2) \times$
$\quad [\sin(e_1) + \sin(e_i)] + \cos(e_i)\cos(a_i)[\sin(e_2) - \sin(e_1)]$ $\gamma_2 = -\{\sin(a_1)\cos(e_1)[\sin(e_2) + \sin(e_i)] - \sin(a_2)\cos(e_2) \times$
$\quad [\sin(e_1) + \sin(e_i)] + \sin(a_i)\cos(e_i)[\sin(e_2) - \sin(e_1)]\}$ $\gamma_i = \sin(a_1)\cos(e_1)[\cos(e_2)\cos(a_2) + \cos(e_i)\cos(a_i)] -$
$\quad \sin(a_2)\cos(e_2)[\cos(e_1)\cos(a_i) + \cos(e_1)\cos(a_i)] -$
$\quad \sin(a_i)\cos(e_i)[\cos(e_1)\cos(a_1) - \cos(e_2)\sin(a_2)]$ $\delta = \sin(a_1)\cos(e_1)[\cos(e_2)\cos(a_2)\sin(e_i) - \cos(e_i)\cos(a_i)\sin(e_2)] -$
$\quad \sin(a_2)\cos(e_2)[\cos(e_1)\cos(a_1)\sin(e_i) - \cos(e_i)\cos(a_i)\sin(e_1)] +$
$\quad \sin(a_i)\cos(e_i)[\cos(e_1)\cos(a_1)\sin(e_2) - \cos(e_2)\cos(a_2)\sin(e_1)]$.

The overdetermined cases can be solved similarly by minimizing error. This equation can be solved even if data from one or more of the transmitter/receiver or receivers is missing.

In order to accurately determine the velocities perpendicular to the bistatic network's ellipsoidal delay time surfaces at the remote bistatic sites, extremely accurate knowledge of the transmitted frequency must be available. Errors of just 3 Hz will result in velocity errors of approximately 0.15 ms$^{-1}$ (assuming 0.1 m transmissions and ignoring the expansion of the frequency-velocity relationship near the transmitter-receiver baselines). This corresponds to a relative frequency error of only one part in $10^9$. Traditional radar frequency sources, while extremely stable over typical transmit-receive delay times, may drift by much more than this over the longer term.

In order to determine the location of resolution volumes (clusters of particles) accurately, the precise time of the transmission of the radar pulses must be known at the receiving sites. To achieve suitable accuracy, the timing must be known within approximately 100 ns.

There are several approaches to meeting this timing requirement, falling into two main categories. In the first, extremely accurate time is kept at both the transmitter and receiver sites and the pulse transmission time is sent, possibly by telephone line, to the receiver sites. The information will arrive well after scattered radiation, but if the pulse repetition frequency changes only rarely, the time of previous pulse transmissions can be used to calculate those in the future. In the second method, the transmitted pulse is detected directly at the receiving sites. This direct radiation, from the existing sidelobes or through radiation beamed intentionally at the remote receiving antennas, will always arrive before any scattered radiation and can be used to start a ranging clock.

Atomic clocks can provide extreme timing accuracy but drift relative to each other. Even though accurate within 1 part in $10^{12}$, they will tend to drift apart by roughly 100 ns per day. Therefore, these clocks must be recalibrated frequently. Either as a method of recalibration or as an independent timing method, the arrival time of direct-path radiation from the sidelobes of the transmitter antenna could be measured. This radiation may be difficult to detect in sheltered locations, thus complicating the accurate calculation of its arrival time. The preferred method of achieving both timing and frequency coherence is to link both sites to an external standard. Both loran and Global Position Satellite (GPS) signals can provide the needed information, but only the GPS signals include time of day information so that the timing coherence can always be maintained without recalibration. Both signals can be used to achieve frequency coherence to well within one part in $10^{10}$ (0.3 Hz at $\lambda = 0.1$ m) if disciplined oscillators with high short-term stability are used.

Figure 2:
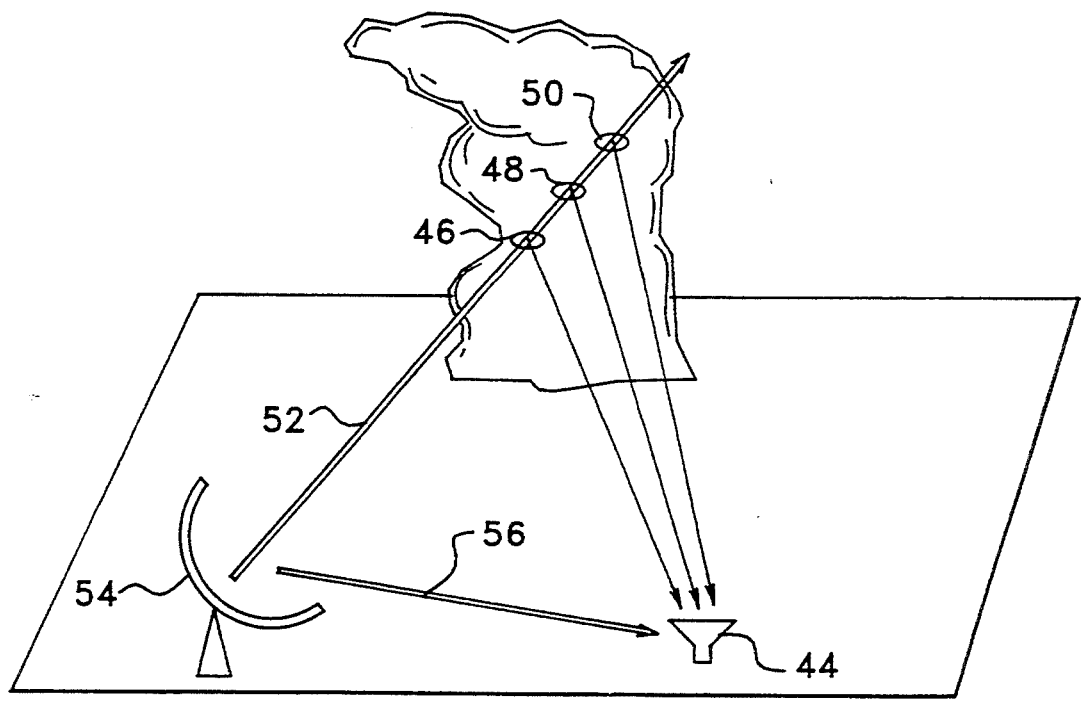
FIG. 2 illustrates a bistatic weather radar configuration with a wide-angle receiving antenna picking up echo signals along the radar pulse beam path and picking up side-lobe radiation from the transmitting antenna for purposes of synchronization.

As shown in FIG. 2, a receiving antenna 44 with a wide-angle view would see an echo signal from successive clusters 46, 48, 50 of particles along the path 52 of the transmitted radar pulse. More particularly, antenna 44 sees a continuous echo signal due to the transmitted pulse illuminating clusters of particles as the pulse moves out from transmitting antenna 54 along beam path 52. This echo signal can be sliced into samples by timed sampling pulses.

FIG. 3A is an example of echo signal strength at a receiving station, and FIG. 3B is an associated timing diagram illustrating the time sampling of the echo signal. In FIG. 3A, the initial and largest spike in the echo signal is the arrival of the radar pulse at the receiving station directly from the transmitting antenna. The echo signal strength thereafter is dependent on oblique scattering from particles in the atmosphere. In FIG. 3B, the data collection period begins just prior to the arrival of the radar pulse. The sampling intervals indicated by the segments of the collection period are preferably 1 microsecond and are not drawn to scale in FIG. 3B. The 60 microseconds between the transmission of the radar pulse and the first spike of the echo signal is simply due to the separation between the transmitting and receiving antennas in the example of FIGS. 3A and 3B. The data collection period lasts anywhere from 200–1000 microseconds depending on the strength of the echo signal, the computational power of the system, and the weather phenomenon being studied.

The echo time samples may be correlated to a position along the beam 52 if the receiving station 44 is synchronized with the transmitting station 54 and has the pointing angle of the transmitting antenna 54 and the distance between the transmitting antenna and the receiving antenna. The pointing angle and the location of the transmitting station would define the beam path 52 through the sky relative to the receiving antenna. If the receiving station is then time synchronized with the transmission of pulses from the transmitting station and knows the distance between transmitting and receiving antenna, the receiving station can then determine the location along beam path 52, where each time sample of the echo signal originated.

In FIG. 2, the receiving station is synchronized with the transmitting station by sensing side-lobe radiation from the transmitting station. When transmitting antenna 54 sends a radar pulse out along beam 52, side-lobe radiation will cause a small portion of the radar pulse radiation to travel along a direct path 56 to receiving antenna 44. The receiving station 44 detects side lobe radiation of the transmitted radar pulse as a flag indicating the beginning of the echo signal.

Figure 4:
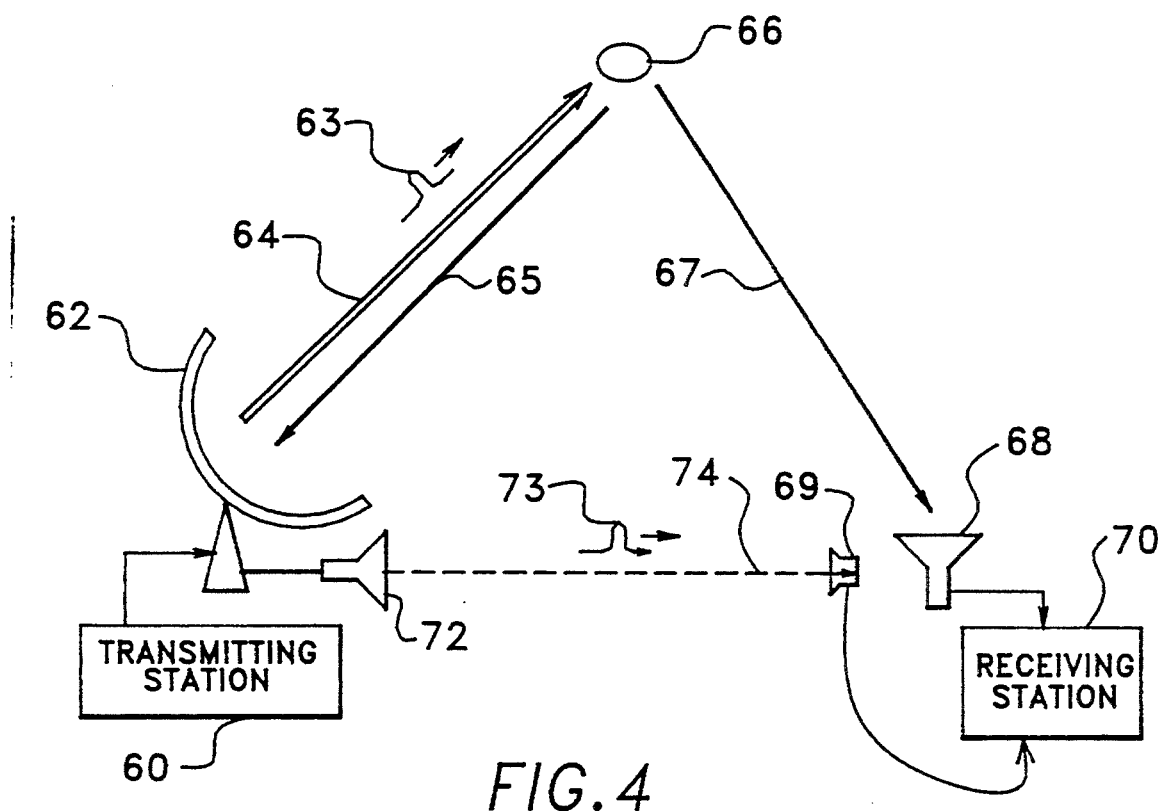
FIG. 4 shows a bistatic radar configuration with deliberately leaked radiation for synchronizing the remote receiver with the transmitter.

Another preferred embodiment of the invention with deliberately leaked radiation; i.e., a synchronization signal directed from transmitter to receiver, is shown in FIG. 4. In this embodiment, receiving station 70 is not dependent on side lobe radiation to detect the transmitted radar pulse. Instead, transmitting station also has an antenna 72 for transmitting a synchronization pulse 73, simultaneous with radar pulse 63, along path 74 directly to antenna 69 at receiving station 70. The frequency of the carrier within sync pulse 73 would be different from the frequency of the carrier within radar pulse 63. This is done so that any echo signals detected at antenna 68 will have a sufficiently different frequency that they are not detected by the echo signal analysis circuits in the receiving station 70. In the preferred embodiment where the radar pulse carrier is 2.78 gigahertz, the carrier frequency of the synchronization signal should have at least 10 megahertz separation from the radar pulse carrier frequency. Alternatively, the synchronization signal could by a CW (Continuous Wave) signal modulated with timing information indicating the time of generation of the radar pulse.

Transmitting station 60 with dish antenna 62 sends the transmitted radar pulse 63 out along beam path 64. The transmitted pulse reflects from particle cluster 66. Transmitting antenna 62 picks up the back scattered echo 65, and wide-angle receiving antenna 68 picks up the obliquely scattered echo 67. Receiving station 70 synchronizes the time sampling of the echo signal 67 based on the transmitted sync pulse 73.

Figure 5:
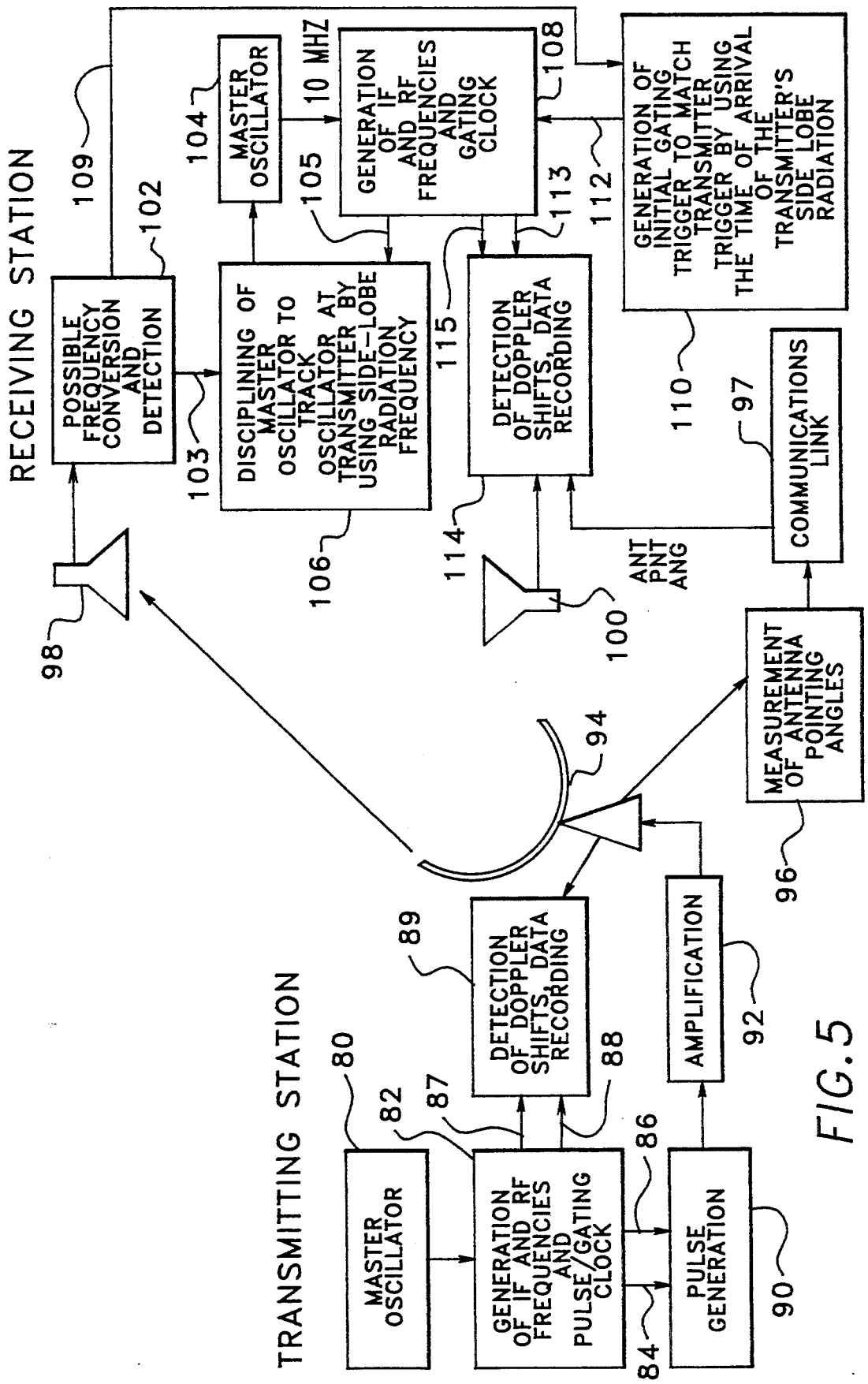
FIG. 5 illustrates the structure of a transmitting station and a receiving station where synchronization is accomplished with side-lobe radiation or deliberately leaked radiation from the transmitter.

In FIG. 5, one preferred embodiment of the transmitting and receiving stations is shown where the transmitting station is free-running and the receiving station is slaved to the transmitting station. The receiving station is synchronized to the transmitting station by leaked side-lobe radiation as depicted in FIG. 2. The receiving station could be synchronized based on a transmitted pulse directed to the receiving antenna as depicted in FIG. 4.

Master oscillator 80 in the transmitting station provides the high frequency signal from which frequency mixing and clock pulse circuits 82 provide the trigger pulse 84 for the radar pulse, the RF carrier frequency 86 for the radar pulse, the IF and RF frequency signals 87 for Doppler shift analysis of the back scattered echo signal and the gating pulses 88 for time sampling the back scattered echo signal. Radar pulse generator 90 modulates the carrier to produce a burst of 2.78 gigahertz frequency signal one microsecond in duration as the radar pulse. The radar pulse signal is amplified by amplifier 92 and transmitted by antenna 94.

The measurement circuits 96 in the transmitting station monitor the pointing angle of the transmitting antenna and send an antenna pointing angle signal to the receiving station. This signal might be sent over any communication link 97, such as telephone lines or a radio link. If a direct sync pulse, or CW signal, is sent to the receiving antenna 69, as described in FIG. 4, an alternative to communication link 97 would be to modulate the carrier in the sync pulse, or the CW signal, with the pointing angle information.

At the receiving station, antenna 98 picks up the radar pulse side-lobe radiation from transmitting antenna 94. Antenna 98 may be a seperate antenna, as shown in FIG. 5, or alternatively the receiving antenna 100 for the echo signal may also be used to pick up the side-lobe radiation. Frequency detection circuits 102 detect the frequency of the carrier frequency burst in the received pulse. If the frequency detected by detection circuits 102 is the same as the RF frequency provided by frequency/clock circuits 82 in the transmitting station, detection circuits 102 pass the frequency signal 103 to the frequency discipling circuits 106. If the frequency is different from the transmitted frequency as where a direct radar timing pulse with a different carrier is sent to antenna 98 from the transmitter, detection circuits convert the frequency of the frequency signal 103 to the transmitting station radar pulse RF frequency before passing the frequency signal 103 to frequency disciplining circuits 106.

Clock circuits 108 generate the RF frequency signal 105 from the frequency signal provided by master oscillator 104. This RF frequency signal 105 is passed back to the frequency disciplining circuits 106. The discipling circuits detect any difference in frequency between the received frequency signal 103 and the RF frequency clock circuits 108, and generate a voltage control signal 107 to control the frequency provided by master oscillator 104. In this manner, the RF frequency at the receiving station is brought into frequency coherrence with the RF signal at the transmitting station.

The detection circuits 102 also detect the arrival of the radar pulse, or the direct timing pulse, and send a detected radar timing pulse 109 to initial trigger generating circuits 110. Initial trigger circuits send an initial trigger pulse 112 to define the start of data collection period in FIG. 3B. Since the radar pulse is repetitive, the initial trigger pulse can be set to time just prior to the arrival of the radar pulse at the receiving station as depicted in FIG. 3B.

When the clock circuits 108 receive the initial trigger pulse, they begin generating the time sampling pulses 113 for the echo signal. The sampling pulses are passed to the data sampling circuits and recorder 114. The echo signal is sampled by the sampling pulses from clock circuits 108, and the echo samples are analyzed for Doppler shift and subsequently for velocity of the particles as described hereinafter. IF and RF frequency signals 115 for Doppler shift analysis of the obliquely scattered echo signal are provided by frequency generation circuits 108. The Doppler shift data is recorded by recorder 114. Alternatively, the echo samples themselves could be recorded and analyzed later for Doppler shift.

Doppler shift detecting and recording apparatus 89 in the transmitting station is sampling the back scattered echo signal. These echo samples are analyzed for Doppler shift and the Doppler shift data detected at the transmitting station is recorded.

The velocity of the particles can then be determined from the velocity components measured at the transmitting and receiving antennas. Accuracy of the velocity data can be increased by adding more receiving antennas to monitor more echo signals from the particles. Of course, the Doppler shift analysis could be done later, if echo samples are recorded at the sampling and recording apparatus 89.

Figure 6:
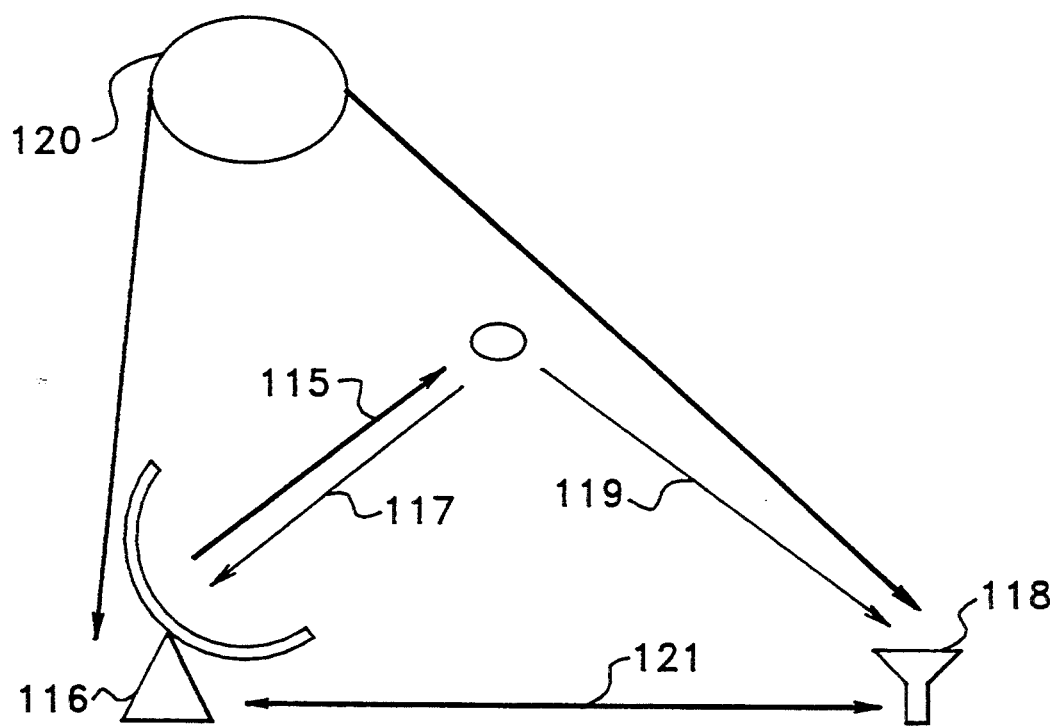
FIG. 6 illustrates a bistatic radar configuration where the signal from a third party station is used to synchronize the receiver and transmitter.

In another preferred embodiment of the invention, the transmitting and receiving stations are frequency disciplined and time synchronized by using a transmitted signal from a third party transmitter. In FIG. 6, transmitting radar station 116 and receiving radar station 118 receive transmitted timing signals from third party transmitting station 120. Radar pulse transmitter 116 transmits a radar pulse along beam path 115. Back scattered echo 117 returns to the transmitter and obliquely scattered echo 119 is detected by receiver 118. Transmitting station 120 might be a television station, a Global Positioning Satellite (GPS), or a ground navigation station. All that is required is the third party transmits a signal containing timing signals from which frequency and timing could be derived. For example, a television signal with the synchronization information for the video signal could be used.

Figure 7:
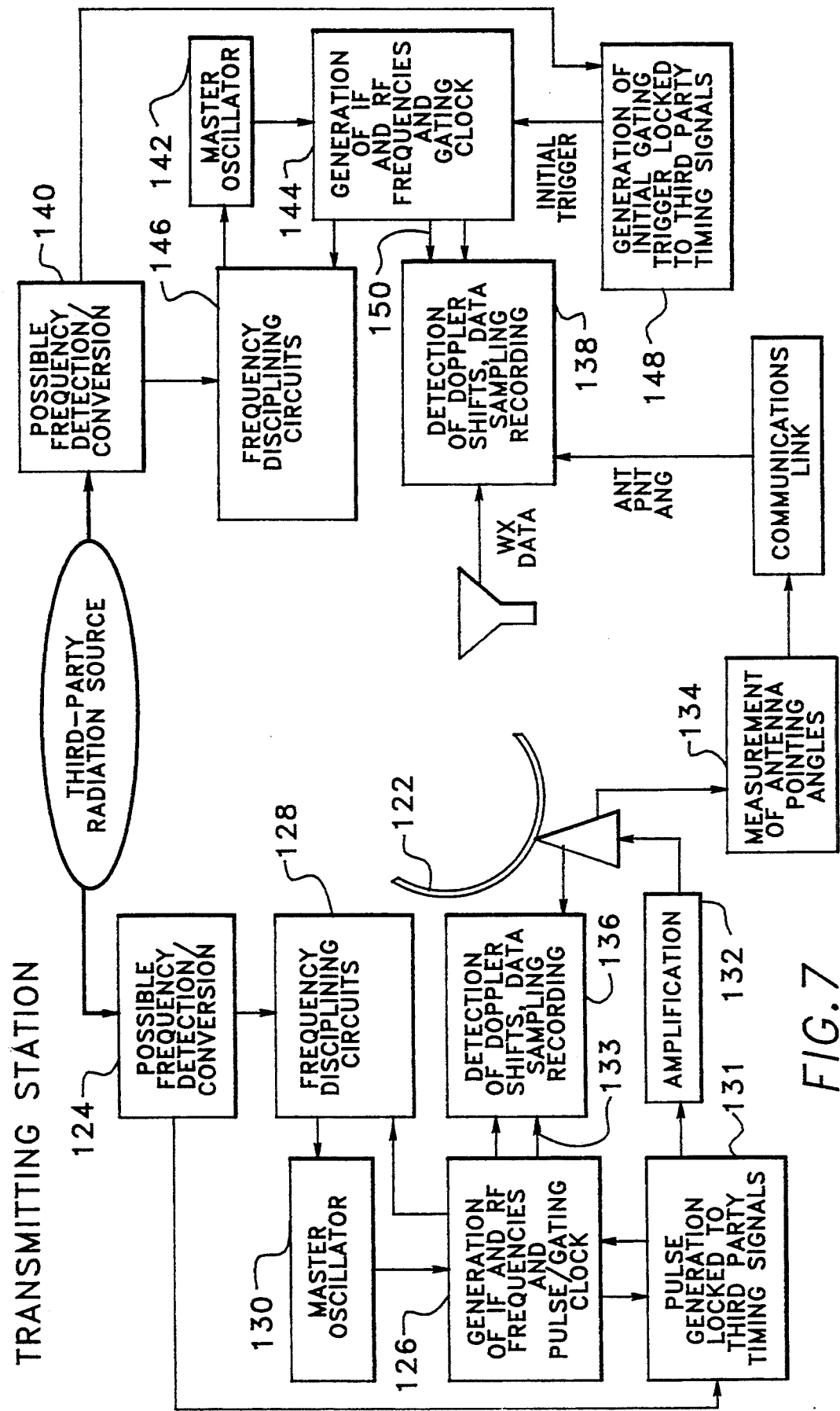
FIG. 7 illustrates the structure of a transmitting station and a receiving station where synchronization is accomplished by slaving the transmitter and receiver to the third party signal.
Figure 8:
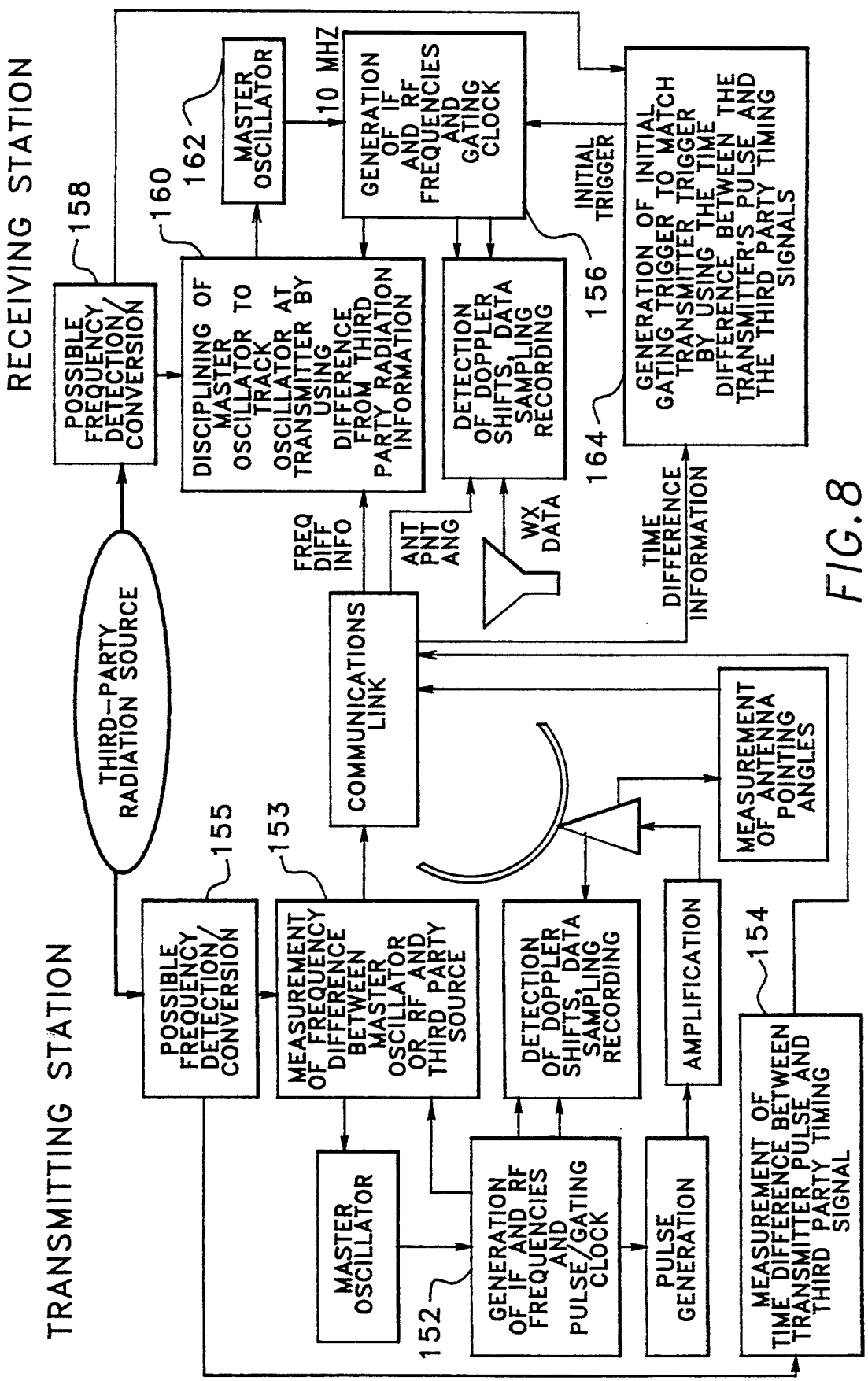
FIG. 8 illustrates the structure of a transmitting station and a receiving station where synchronization is accomplished by slaving the receiver to transmitter while using the third party signal as a reference.

The third party transmitted signal may be used to slave both the transmitting radar station and the receiving radar station to the third party signal, as shown in FIG. 7. Alternatively, the third party transmitted signal may be used at the transmitting station to provide a relative time difference between the transmitted radar pulse and a timing pulse derived from the third party transmitted timing pulse and a frequency difference between the frequency burst in the radar pulse and a frequency derived from the third party signal. This time difference and frequency difference is communicated from the transmitting station to the receiving station over a communicaiton link 121, and used to slave the receiving station frequency and sampling pulses to the frequency and timing of the radar pulses transmitted at the transmitting station, as shown in FIG. 8.

In FIG. 7, the third party transmitted signal is sensed at the antenna 122 or at a separate antenna (not shown). For simplicity of illustration, the third party signal is shown in FIG. 7 as applied at detection/conversion circuits 124. Detection circuits 124 detect the frequency of the third party signal, or the frequency of the timing pulses in the third party signal, and convert that frequency to the same frequency as the RF signal provided by frequency generating and clocking circuits 126. Frequency disciplining circuits 128 then control the master oscillator 130 to adjust the RF signal frequency of the radar transmitting station to a frequency derived from the third party transmitted signal. This frequency disciplining operation is the same as previously described for the receiving station in FIG. 5, except that the frequency being tracked is the frequency from the third party station rather than the radar transmitting station.

Detection circuits 124 also detect the timing signals in the third party signal and forward a timing pulse to pulse generation circuits 131. Pulse generation circuit generates the radar pulse at some periodic rate relative to the detected third party timing pulse. The timing of the radar pulse is passed back as an initial trigger pulse to the clock circuits 126. From the initial trigger pulse, clock circuits 126 provide the time sampling signals used by the Doppler shift detection, data sampling and recording apparatus 136.

Clock circuits 126 also generate the RF and IF signals. The RF signal is passed to pulse generator 131. Generator circuits 131 then modulate the RF signal with a pulse to generate a radar pulse signal as a burst of carrier frequency. The radar pulse is amplified by amplifier 132, and the amplified radar pulse is then transmitted from transmitting antenna 122.

Just as in FIG. 5, measurement circuits 134 measure the pointing angle of the transmitting antenna and pass the pointing angle information to the data sampling circuits 136 in the transmitting station and the echo data sampling circuits 138 in the receiving station.

At the receiving station in FIG. 7, the detection circuits 140, master oscillator 142, clocking circuits 144 and frequency disciplining circuits 146 operate in the same manner as the same circuits in the transmitting station. Thus, the RF signal in frequency generating/clocking circuits 144 is slaved to the same frequency as the RF signal in frequency ,generating circuits 126 and both are derived from the third party transmitted signal. Similarly, the detection of the timing signals in the third party signal produces a timing pulse passed to pulse generation circuits 148.

Pulse generation circuits 148 generate an initial trigger pulse to define the start of the data collection period for the echo signal sampling. This initial trigger pulse has a periodicity derived from the timing pulse in the same manner as the radar pulse derived from the timing pulse in pulse generation circuits 131 at the transmitting station.

The initial trigger pulse at the receiving station is delayed relative to the transmission of the radar pulse to allow for dead time between transmission of the radar pulse at the transmitting station, and arrival of the radar pulse at the receiving station. The delay also depends on the relative timing between the arrival of third party timing pulses at the transmission station and the receiving station. The two timing pulses would have a time difference depending on the distances from the third party transmitter to the radar transmitting station and the radar receiving station.

When the clock circuits 144 receive the initial trigger pulse, they start sending the sampling time pulses 150 to the data sampling and detection circuits 138. Data sampling and recording circuits 136 and 138 operate in the same manner as previously described for data sampling and recording circuits 89 and 114 in FIG. 5.

In the embodiment of FIG. 8, the invention uses the third party timing pulses to slave the radar receiving station to the radar transmitting station. Only the difference in operations between FIGS. 7 and 8 will be described for FIG. 8. The RF signal at frequency generating circuits 152 is not locked to the frequency derived from the third party signal as in FIG. 7. Instead, frequency measurement circuits 153 detect the frequency difference between frequency derived from the third party signal and the RF signal frequency from frequency generating circuits 152. The frequency difference information is transmitted over the communication link to the receiving station.

Pulse time difference measurement circuit 154 is added in FIG. 8. This circuit measures the time difference between a timing pulse derived from the third party timing signal and the timing of the radar pulse. This time difference is transmitted to the receiving station over a communication link so that the receiving station can derive an initial trigger pulse indicative of transmission of the radar pulse by the transmitting station.

At the receiving station, the RF signal produced by clocking circuits 156 is slaved to the frequency of the RF signal provided by the clocking circuits 152 in the radar transmitting station. This is accomplished by frequency detection circuits 158 detecting the frequency of the carrier in the third party transmitted signal, frequency disciplining circuits 160 changing the frequency signal provided by detection circuits 158 by the frequency difference between transmitted RF signal and third party signal frequency provided by measurement circuits 153. This produces an adjusted reference frequency signal the same as the frequency of the RF signal in the radar transmitting station. The frequency disciplining circuits 160 then adjust the master oscillator 162 to lock the RF signal frequency from clocking circuits 156 to the frequency of the adjusted reference frequency signal.

To set the sampling pulses for the echo signal, the receiving station detects the timing pulses from the third party signal and passes those timing pulses to initial trigger generating circuits 164. The initial trigger generating circuits also receive the time difference between the derived third party timing pulses and the transmitted radar pulse at the transmitting station. Accordingly, trigger pulse generating circuits 164 derive a timing pulse from the third party pulse in the same manner as described for circuits 154 at the radar transmitting station. Due to the difference in transmission distances from the third party station to the radar transmitting station and the radar receiving station, the derived timing pulse at the receiving station will have a time difference relative to the derived timing pulse at the transmitting station. This fixed delay may be adjusted out so that the derived timing pulses are simultaneous at the radar transmitting and receiving stations.

The initial trigger circuits then use the time difference information from measurement circuits 154 at the transmitting station to define the time of transmission of the radar pulse for the receiving station. Initial trigger pulse circuits 164 may then generate the initial trigger pulse relative to the timing of the transmitted radar pulse in accordance with the desired starting point for the data collection period of FIG. 3B, as described above.

Figure 9:
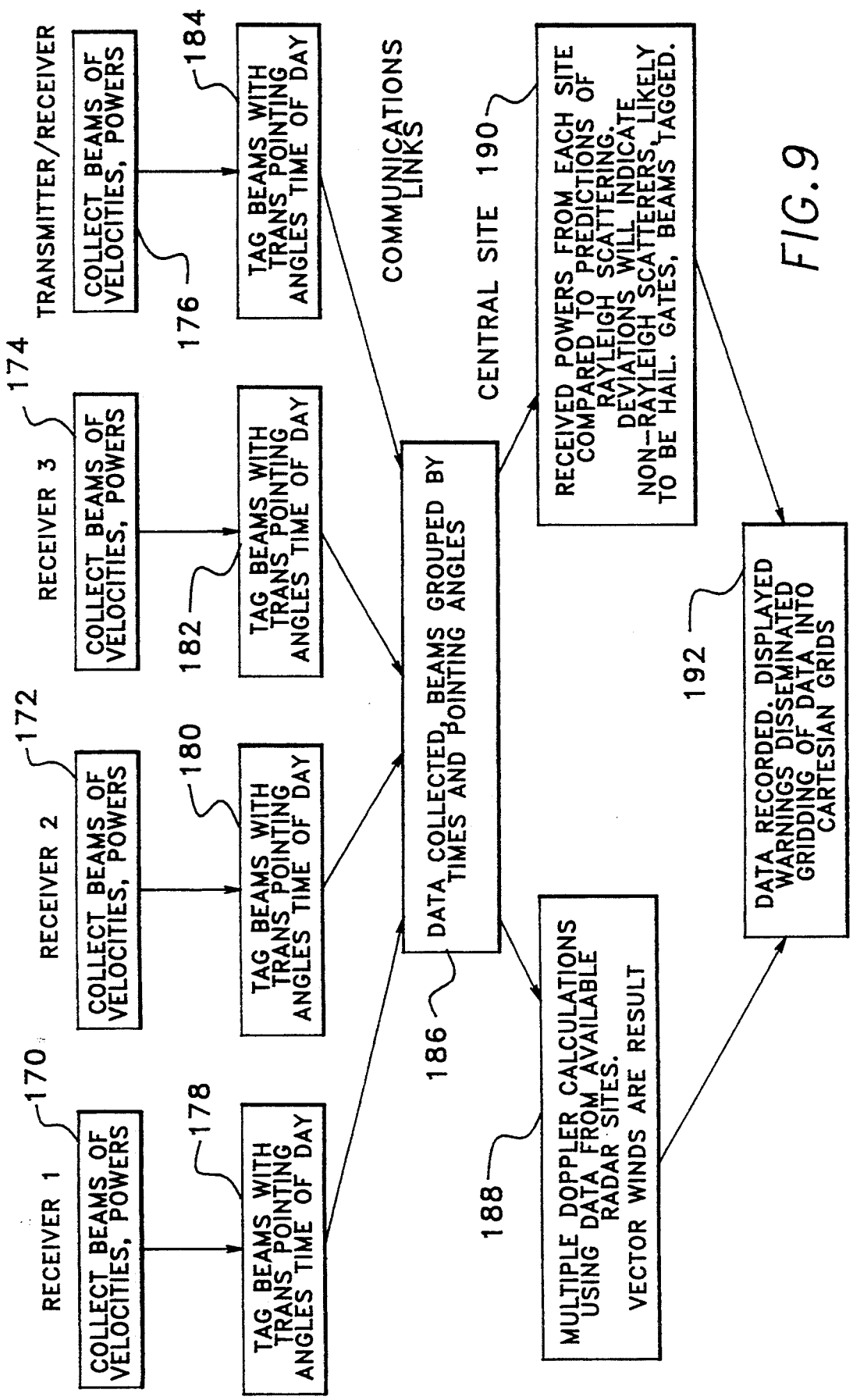
FIG. 9 shows the logical operations for calculating wind velocity and determining warnings of weather phenomenon from the bistatic multiple-Doppler weather data collected at a transmitter/receiver and three wide-angle receivers.

In FIG. 9, logical operations for computing wind velocities of particle clusters and for detecting deviations from Rayleigh scattering for particles are shown. Three receiver stations and a single transmitter/receiver station are shown. The transmitter/receiver station supplies the radar pulse and detects the backscattered echo signal; the receivers detect the obliquely scattered echo signal. Operations 170, 172, 174 and 176, in each station, collect the echo signal sampled data—velocity and power (strength of signal) for each beam from the transmitting station. Each station tags the echo signal sample data from each with the time of day and the transmitter pointing angle in operations 178, 180, 182 and 184.

At a central site, operation 186 sorts and compiles the collected and tagged data by beam, time and pointing angle. Data from any two or more of the transmitter/receiver and the receivers may be used. The compiled data is analyzed by operation 188 for wind velocity in accordance with the equations cited above. The same compiled data is also analyzed by operation 190 for deviations from Rayleigh scattering. Rayleigh scattering equations in conjunction with bistatic radar equation (Rogers and Eccles, "The Bistatic Radar Equation For Randomly Distributed Targets," *Proceedings of the IEEE*, 59, pp. 1019–1021) predict how much power each receiver should detect relative to each other receiver. Operation 190 will issue a warning if the deviations from the predictions indicate the presence of non-Rayleigh scattering particles; i.e., probably hail. In operation 192, the the central processing site displays wind and deviation data by Cartesian grids and issues storm warnings as appropriate.

Figure 10:
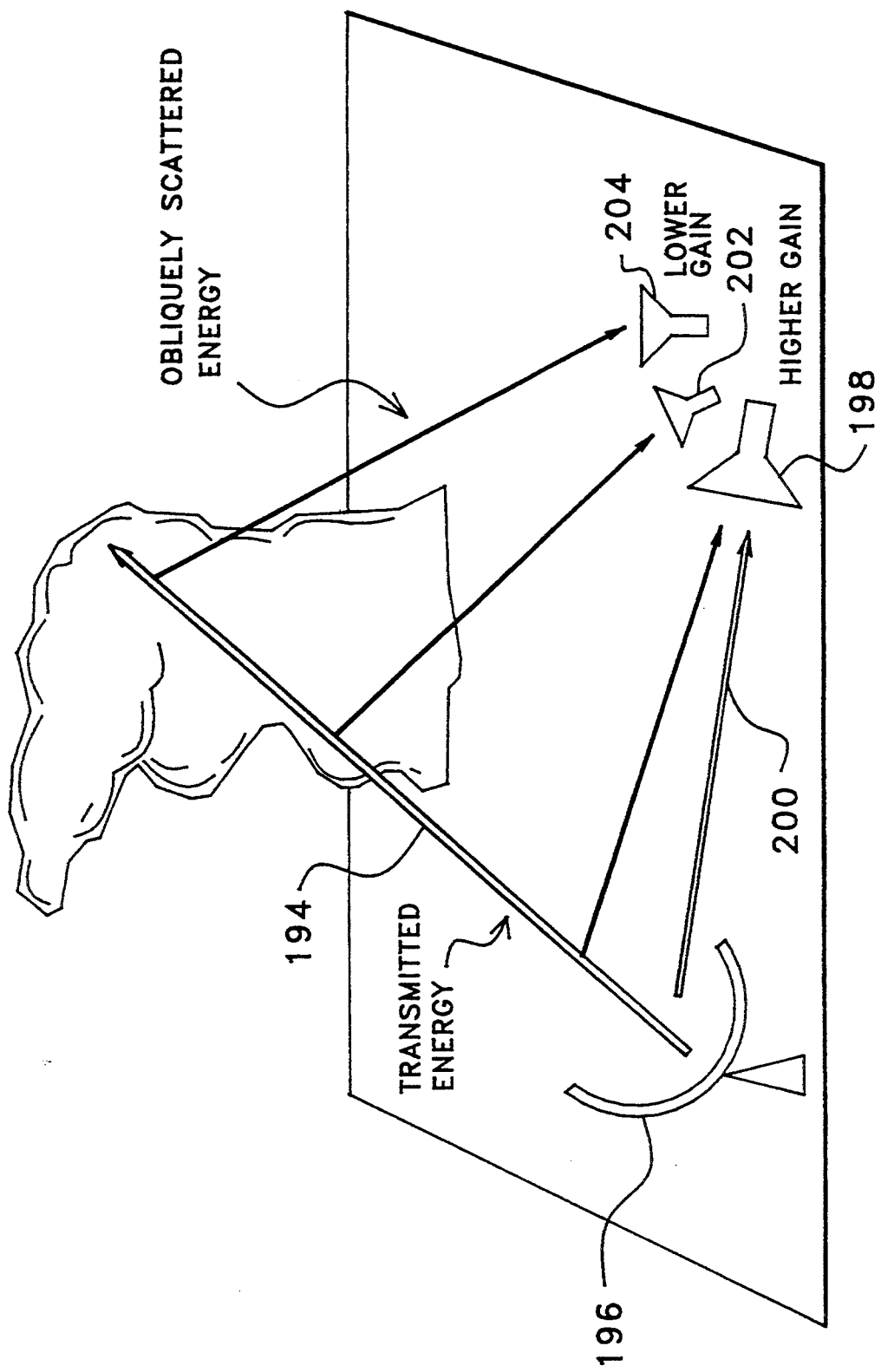
FIG. 10 shows an alternative embodiment for implementing a wide-angle receiving station.

In FIG. 10, there is an alternative embodiment for each wide-angle receiving station. The wide angle view of the receiving antenna is accomplished with multiple receiving antenna pointed at different portions of the beam path 194 for the radar pulses emitted by transmitting antenna 196. In this particular example, a higher gain antenna 198 with a more narrow viewing angle is aimed at the lower portion of the beam path. The higher gain antenna 198 is also well positioned to pick up sidelobe radiation 200 from the transmitting antenna. Antenna 202 with a moderate viewing angle is pointed to view the middle portion of beam path 194, and antenna 204 with a moderate viewing angle is pointed to view the upper portion of the beam path 194.

The receiving station attached to antennas 200, 202 and 204 samples the echo signal from each antenna in turn as the radar pulse travels through the lower portion, the middle portion and upper portion of the beam path, respectively. Using the transmitting antenna 196 pointing angle, the time of transmission of the radar pulse, and the data sampling time, the receiving station can switch between antennas to feed the echo signal from the appropriate antenna to the Doppler shift analysis circuits (for example, circuits 114 in FIG. 5). Alternatively, the Doppler shift analysis circuits can be duplicated for each antenna. In this case, operation 186 (FIG. 9) at the central site discriminates between which data to use from each receiving station based on the pointing angle of the transmitting and receiving antennas, the transmission time of the radar pulse and the data sampling time.

While a number of preferred embodiments of the invention have been shown and described, it will be appreciated by one skilled in the art, that a number of further variations or modifications may be made without departing from the spirit and scope of the invention.

What is claimed is:

1. In a Doppler-radar weather network for scanning the sky, said network having a transmitting station with a transmitting antenna and a receiving station with a receiving antenna, a method for measuring the velocity of particles suspended in air comprising the steps of:

transmitting a radar pulse of electromagnetic radiation from a transmitting antenna at a first radar station, said radar pulse transmitted along a beam path defined by the transmitting antenna;

receiving an echo signal of the radar pulse with a receiving antenna at a second radar station, said receiving antenna has a viewing angle wide enough to receive echo signals from particles along the length of the beam path as the particles are illuminated by the radar pulse traveling down the beam path;

sampling the echo signal to define echo signal samples of particles at different locations along the beam path; and synchronizing the sampling of the echo signal at the receiving station with the transmission of radar pulses at the transmitting station to define the location of the particles along the beam path for each echo signal sample.

2. The method of claim 1 wherein said transmitting step comprises the steps of:

generating a first pulse defining the time and duration of the radar pulse;

generating a first signal at a predetermined frequency; and gating the first signal with the first pulse to produce the radar pulse as a burst of electromagnetic radiation at said predetermined frequency.

3. The method of claim 2 and in addition the steps of:

disciplining the frequency of a signal source at the receiving station to the predetermined frequency of the first signal at said transmitting station; and analyzing the Doppler shift from the predetermined frequency of each sample of the echo signals at the receiving station.

4. The method of claim 1 and in addition the step of:

measuring the pointing angle of the transmitting antenna to defining the beam path from the transmitting antenna.

5. The method of claim 1 and in addition the step of:

determining an echo signal source along the beam path for each echo signal sample based on the relative time between transmission of the transmitted radar pulse and receipt of each echo signal sample at the receiving antenna.

6. The method of claim 1 wherein said synchronizing step comprises the steps of:

monitoring side-lobe radiation from the transmitting antenna to detect the receipt of the radar pulse; and setting the time sampling performed by said sampling step at predetermined time sampling intervals relative to receipt of the radar pulse, 7. The method of claim 4 wherein the transmitting antenna beams a transmitted radar pulse directly at the receiving station.

8. The method of claim 1 wherein radiation from a third party transmitter provides a timing signal and said synchronizing step comprises the steps of:

setting the transmission time of the radar pulse relative to the timing signal from the third party station;

deriving echo signal sampling times from the timing signal of the third party station whereby said sampling begins relative to the transmission time of the radar pulse at transmitting antenna.

9. The method of claim 8 wherein said transmitting step comprises the steps of:

generating a first pulse defining the time and duration of the radar pulse;

generating a first signal at a predetermined frequency;

gating the first signal with the first pulse to produce the radar pulse as a burst of electromagnetic radiation at said predetermined frequency;

and in addition the method further comprises the steps of:

disciplining the predetermined frequency of the first signal at the transmitting station to a reference frequency derived from the third party timing signal;

disciplining the frequency of a signal source at the receiving station to the reference frequency derived from the third party station;

analyzing the Doppler shift from the predetermined frequency of each sample of the echo signals at the receiving station.

10. The method of claim 1 wherein radiation from a third party transmitting station provides a third party timing signal and said synchronizing step comprises the steps of:

detecting the third party timing signal at the transmitting station and at the receiving station;

measuring the time difference between third party timing signal and timing signals at the transmitting station;

slaving timing signals at the receiving station to timing signals at the transmitting station based on said time difference and the third party timing signal;

deriving the relative time between transmitted radar pulse and echo signal samples from the slaved timing signals.

11. The method of claim 10 wherein said transmitting step comprises the steps of:

generating a first pulse defining the time and duration of the radar pulse;

generating a first signal at a predetermined frequency;

gating the first signal with the first pulse to produce the radar pulse as a burst of electromagnetic radiation at said predetermined frequency;

and in addition the method further comprises the steps of:

deriving a reference frequency from third party timing signal at the transmitting station and at the receiving station;

measuring the frequency difference between third party timing signal and predetermined frequency at the transmitting station;

slaving the frequency signal source at the receiving station to predetermined frequency at the transmitting station based on said frequency difference and the reference frequency derived from the third party timing signal;

analyzing the Doppler shift from the predetermined frequency of each sample of the echo signals at the receiving station.

12. The method of claim 1 and in addition a plurality of receiving stations.

* * * * *